(12) United States Patent
Quell et al.

(10) Patent No.: US 9,098,998 B2
(45) Date of Patent: Aug. 4, 2015

(54) IR HAZARD BEACON

(75) Inventors: Peter Quell, Osterrönfeld (DE); Detlef Bolz, Gross-Grönau (DE)

(73) Assignee: SENVION SE, Hamburg (DE)

( * ) Notice: Subject to any disclaimer, the term of this patent is extended or adjusted under 35 U.S.C. 154(b) by 257 days.

(21) Appl. No.: 13/819,640

(22) PCT Filed: Aug. 17, 2011

(86) PCT No.: PCT/EP2011/004129
§ 371 (c)(1),
(2), (4) Date: Feb. 27, 2013

(87) PCT Pub. No.: WO2012/025205
PCT Pub. Date: Mar. 1, 2012

(65) Prior Publication Data
US 2013/0278445 A1    Oct. 24, 2013

(30) Foreign Application Priority Data
Aug. 27, 2010  (DE) .......................... 10 2010 035 703

(51) Int. Cl.
*G08G 5/00*  (2006.01)
*F03D 11/00*  (2006.01)
*F21W 111/00* (2006.01)
*F21W 111/06* (2006.01)
*F21Y 101/02* (2006.01)
*F21Y 113/00* (2006.01)

(52) U.S. Cl.
CPC .......... *G08G 5/0047* (2013.01); *F03D 11/0041* (2013.01); *F21W 2111/00* (2013.01); *F21W 2111/06* (2013.01); *F21Y 2101/02* (2013.01); *F21Y 2113/005* (2013.01); *Y02E 10/722* (2013.01)

(58) Field of Classification Search
CPC ........... F03D 11/0041; F21W 2111/00; F21W 2111/06; F21Y 2101/02; F21Y 2113/005; G08G 5/0047; Y02E 10/722
USPC ......... 340/983, 945, 984, 985, 978, 979, 980, 340/981, 982, 963, 953–961, 949
See application file for complete search history.

(56) References Cited

U.S. PATENT DOCUMENTS

| | | | |
|---|---|---|---|
| 6,509,844 B1 * | 1/2003 | Eyring | 340/954 |
| 6,567,248 B1 | 5/2003 | Schmidt | |
| 6,647,774 B1 * | 11/2003 | Youngquist | 73/170.02 |
| 2001/0025900 A1 * | 10/2001 | Kramer | 244/2 |
| 2004/0089763 A1 * | 5/2004 | Redmond | 244/10 |
| 2005/0007257 A1 * | 1/2005 | Rast | 340/815.45 |
| 2006/0008238 A1 * | 1/2006 | Suzuki et al. | 385/147 |
| 2009/0115336 A1 | 5/2009 | Wang | |

(Continued)

FOREIGN PATENT DOCUMENTS

| | | |
|---|---|---|
| DE | 20 2007 005003 U1 | 7/2007 |
| EP | 1 282 888 B1 | 2/2006 |
| EP | 2 199 608 A1 | 6/2010 |

*Primary Examiner* — Daniel Previl
(74) *Attorney, Agent, or Firm* — Lazaris IP

(57) ABSTRACT

The invention relates to a method for operating a wind turbine by switching on an aircraft warning light, the luminaries of which comprise LEDs, said LEDs radiating light with a maximum intensity in the range of visible light. At least one NIR LED is switched on when the aircraft warning light is switched on, said at least one NIR light source radiating light with a maximum intensity in the NIR range.

25 Claims, 3 Drawing Sheets

(56) References Cited

U.S. PATENT DOCUMENTS

2009/0289804 A1* 11/2009 Carstensen et al. ........... 340/601
2010/0098844 A1* 4/2010 Pettinger ...................... 427/164
2011/0109236 A1* 5/2011 Zhurin et al. ............. 315/209 R

* cited by examiner

IR HAZARD BEACON

CROSS REFERENCE TO RELATED PATENT APPLICATIONS

This patent application is filed herewith for the U.S. National Stage under 35 U.S.C. §371 and claims priority to PCT application PCT/EP2011/004129, with an international filing date of Aug. 17, 2011. The contents of this application are incorporated in their entirety herein.

STATEMENT REGARDING FEDERALLY-SPONSORED RESEARCH OR DEVELOPMENT

Not applicable.

TECHNICAL FIELD

The invention relates to a method of operating a wind energy plant according to the preamble of claim 1 as well as to a wind energy plant for performing a method according to the preamble of claim 3. The invention also relates to a method of operating a wind farm as well as to a wind farm for performing the method.

BACKGROUND OF THE INVENTION

Depending upon the location and requirements, wind energy plants must be provided with a specified flight navigation device. In Germany, they must be marked for example by an obstruction light, a hazard beacon, a blade tip obstruction light or Feuer W rot (="W red light" standard) in accordance with their overall height (see Nachrichten für Luftfahrer [News for Airmen], Part I, Deutsche Flugsicherung [German Air Traffic Control], January 2005). While hazard beacons have a light intensity of more than 1=2000 cd, the light intensity of obstruction lights is only at least 1=10 cd and amounts to only a fraction of the light intensity of hazard beacons. The navigation lighting in wind energy plants is normally always designed in pairs and in a redundant manner.

A flight navigation device for a wind farm is known from EP 1 282 888 B1, in which the individual wind energy plants are equipped with one flight navigation device in each case and the wind farm control comprises a synchronization unit which synchronizes the lighting means in such a way that the lighting means of the various wind energy plants are switched on and off simultaneously.

It is the object of the invention to make available a method of operating a wind energy plant and a wind energy plant which operates with such a method, the method and wind energy plant being more reliable.

It is also the object of the invention to make available a method of operating a wind farm and a wind farm, the method and wind farm being more reliable.

The object is attained with respect to the first method by a method specified in the introduction and having the characterizing features of claim 1.

In this case, flight navigation devices are understood as being both hazard beacons and obstruction lights. Modern flight navigation devices usually have the lighting means in the form of LEDs. As compared with conventional filament lamps or discharge lamps, LEDs require little maintenance and are wear-free. A drawback of LEDs, however, is that they have only a very limited radiation spectrum. By way of example, the red LEDs to be used for the flight navigation devices radiate wavelengths in a range of between $\lambda=610$ to 750 nm. LEDs radiating in the visible spectrum range are referred to below as VIS LEDs. In this way, the demands made upon the marking of obstructions are indeed met in the visible light spectrum. Night flights, in particular of helicopters, are usually not carried out in the region of wind energy plants or wind farms, but the pilots in question usually fly around these obstructions. Under certain circumstances, however, for example during the rescue of stranded persons in offshore wind farms, it may be necessary to have to fly at night in the vicinity of wind farms or into the wind farms. Night flights, in particular night flights of helicopters, are frequently carried out with night-vision devices. The night-vision devices detect the light spectrum in the near infrared range (NIR) and convert this into visible light. In this case the NIR range is in wavelengths of from $\lambda=750$ nm to $\lambda=1500$ nm. The operating range of the night-vision devices covers, depending upon the device, different spectral ranges in the NIR in this case, but it does not extend into the visual spectral range of from $\lambda=350$ nm to $\lambda=750$ nm. Since the spectral range of the LED flight navigation devices radiating only in the visual range does not correspond to the detection range of the night-vision devices, it is possible for wind energy plants to be overlooked during night flights, and dangerous situations can arise.

BRIEF SUMMARY OF THE INVENTION

According to the invention, therefore, in addition to the VIS LED radiating visible light, at least one light source radiating in the NIR range is arranged in each case on the wind energy plant.

A light source radiating in the NIR range is understood in this case as being a source of which the radiation spectrum is predominantly in the wavelength range of from $\lambda=750$ to 1500 nm, preferably in the wavelength range of from $\lambda=800$ to 850 nm. The light source radiating in the NIR range can likewise be for example an NIR LED with a maximum light intensity in the NIR range. It is also possible, however, for the NIR light source to be equipped in the form of a conventional lamp with an NIR filter, in the form of a halogen lamp with a tungsten wire or in the form of an additional NIR device.

The NIR light source can have an NIR LED or can be designed in the form of one. The NIR light source can also, however, have a conventional lamp, in particular a discharge lamp or a filament lamp which is surrounded by an NIR filter which lets through only or predominantly the NIR radiation. The NIR light source can also be designed in the form of an NIR obstruction light.

The radiation spectrum of the NIR light source and the detection range of the night-vision devices are adapted to each other.

The flight navigation device switches into a night navigation mode in darkness, and the night navigation mode is switched off in daylight. The at least one NIR light source is switched on and off with the night navigation mode. Darkness and daylight are understood in this case as being the brightness figure which is specified by current safety standards and which makes it necessary to switch on the flight navigation device or to switch it off respectively.

A detection device which comprises a dimmer switch can preferably be connected in front of the NIR light source, so that an automatic switching on and off is carried out in a manner dependent upon a brightness threshold value at the onset of twilight and the onset of dawn respectively.

In another embodiment of the invention the detection device responds to an external switch-on signal, such as for example a transponder signal of an aircraft or another external radio signal. In this way, the NIR navigation light is switched on only upon the approach of an aircraft radiating the signature.

It is advantageous for flashing pulses of the at least one visible VIS LED and the at least one NIR light source to be synchronized with one another, namely in such a way that visible VIS LEDs and the at least one NIR light source are correlated with one another and emit flashing pulses or sequences of flashing pulses at uniform, and preferably constant, time intervals. In particular, the flashing pulses of the VIS LEDs and the NIR light source should be synchronized in such a way that both radiate light at the same time.

With respect to the wind energy plant the object is attained by a wind energy plant specified in the introduction and having the characterizing features of claim 6.

The flight navigation device has at least one NIR light source which radiates with maximum intensity in the NIR range.

As well as the LED, it is preferable for an NIR light source to be mounted on the machine housing, preferably on the roof of the machine housing of the wind energy plant. It is advantageous for two NIR light sources arranged at a distance from each other to be provided on the outside on the roof of the machine housing. A distance transverse to the longitudinal direction of the machine housing or along, preferably parallel to the plane of rotation of the rotor blade, is preferably larger than a diameter of a rotor blade at the level of the NIR light sources.

The visible LED is advantageously synchronized with the at least one NIR light source by way of a synchronization unit, preferably in the manner described above. The synchronization unit actuates the NIR light sources so that they flash simultaneously. As well as each of the visible LEDs, it is preferable for a further NIR light source to be provided.

In a preferred further development of the invention the flight navigation device comprises at least one light source which has a plurality of VIS LEDs and NIR LEDs extending along an external horizontal periphery. In this case the LEDs are arranged in such a way that at least one VIS LED with maximum intensity and at least one NIR LED radiate in each horizontal direction. As a result, aircraft approaching from all directions can be warned both by visible light and by NIR radiation.

The light source can be designed in the form of an integrated component. As a result, a simple assembly is made possible.

The VIS LEDs and NIR LEDs are preferably arranged in a plurality of annular rows arranged one above the other in the vertical direction, in which case at least two rows have VIS LEDs and at least two other rows have NIR LEDs.

In a particularly advantageous embodiment of the invention the flight navigation device has a detection device for external switch-on signals. In particular, it is possible for the detection device to be a dimmer switch and/or the detection device for the signature or the transponder signal of an aircraft.

With respect to the second method of operating the wind farm the object is attained by a method specified in the introduction and having the features of claim 13. According to the invention the flight navigation lights of a plurality of wind energy plants of a wind farm are synchronized with one another. The flight navigation light generates NIR flashing pulses by each of the NIR light sources during operation. The NIR flashing pulses of different wind energy plants are synchronized in such a way that they occur simultaneously. In this case the synchronization can be carried out by a synchronization signal or preferably by a time simultaneity derived from a time signal. In the latter case the time signal can be produced by the detection of an external radio signal capable of being received on site (for example GPS, RDS or DCF77) and derivation of a pre-set flashing pulse time.

The synchronization is preferably carried out by way of a synchronization signal which is generated by a flight navigation means and which is delivered to the flight navigation devices of the individual wind energy plants.

It is also possible for the flight navigation means to be synchronized to an external radio signal.

With respect to the wind farm the object is attained by a wind farm for performing the method specified above, with the features of claims 23 and 25. According to the invention a synchronization unit of the flight navigation devices of at least two wind energy plants of the wind farm is provided. The synchronization unit can generate a synchronization signal which is delivered to the flight navigation devices of the individual wind energy plants.

BRIEF DESCRIPTION OF THE SEVERAL VIEWS OF THE DRAWINGS

The invention is described in four Figures with reference to an embodiment. In the drawing

DETAILED DESCRIPTION OF THE INVENTION

Figure 1A:
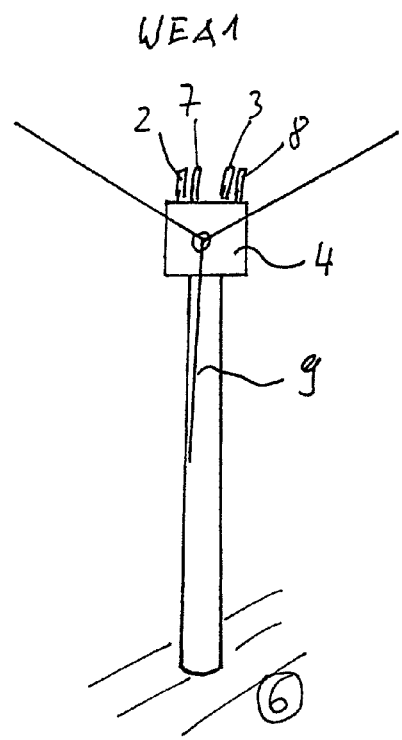
FIG. 1*a* is a diagrammatic front view of a wind energy plant according to the invention.
Figure 1B:
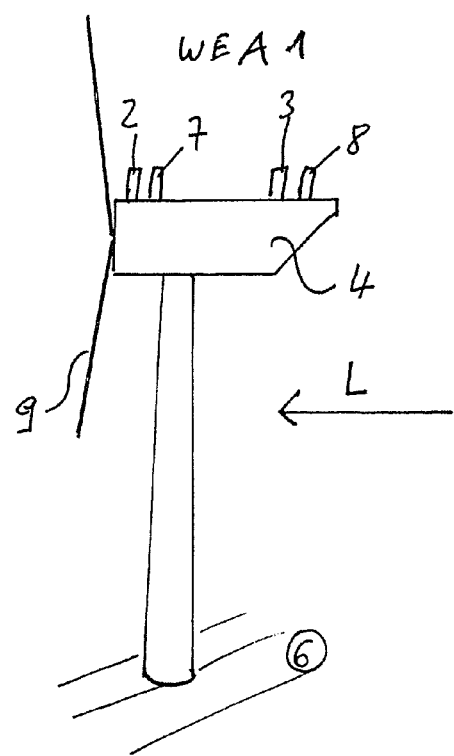
FIG. 1*b* is a diagrammatic side view of the wind energy plant in FIG. 1*a;*

The wind energy plant WEA 1 according to the invention illustrated in FIG. 1*a*, FIG. 1*b* has, first of all, the at least two LED arrays 2, 3 which are used in a conventional manner and which are arranged at a distance from each other and obliquely offset on a roof of machine housing 4. An array is understood in this case as being a specified arrangement of a plurality of LEDs. It is also possible, however, for an individual LED to be provided in an LED array. In this case the relative arrangement of the two LED arrays 2, 3 is selected on the basis of safety regulations in such a way that in the front view as shown in FIG. 1*a* from a point at the level of the machine housing 4 above sea level or the ground 6 to the machine housing 4 at least one of the two LED arrays 2, 3 will always be visible, despite the rotor blade 9 sweeping past or being stationary, in order to warn in a reliable manner a helicopter for example approaching at the level of the machine housing 4 of the wind energy plant 1. The two LED arrays 7, 8 are spaced further from each other at a right angle to a longitudinal direction L of the machine housing than the diameter of the rotor blade 9 at the same level above the sea bed or the ground 6.

Individual LEDs have a radiation intensity which is strongly dependent upon the direction. The radiation intensity is strongest in the main radiation direction of the LED and decreasing in a lobar manner at an angle of approximately 20° around the main radiation direction. In order to equalize the direction dependency of the radiation intensity, as a rule a plurality of LEDs are arranged in the form of an array 2, 3. The radiation intensity is approximately constant along a horizontal 360° periphery in the LED arrays 2, 3.

In principle, the wavelength spectrum of a VIS LED is relatively narrow. Depending upon the colour radiated, it is between $\lambda=610$ to 750 nm in the case of red LEDs or between $\lambda=400$ to 450 nm in the case of violet LEDs. The VIS LED arrays 2, 3 illustrated in FIGS. 1a and 1b have a plurality of individual LEDs with the same radiation spectrum. The individual VIS LEDs of the arrays 2, 3 are arranged in such a way that each of the arrays 2, 3 radiates substantially with the same power in all directions in the horizontal plane.

In accordance with regulations applying internationally (for example in accordance with the ICAO Appendix 14 Volume I), "red" must generally be used as the light colour for obstruction lights and navigation lights.

In addition, there may also be a white daytime navigation light which is used instead of or in addition to red colour markings. The white daytime marking, however, is switched off at night.

According to the invention two NIR LED arrays 7, 8 are arranged on the roof of the machine housing 4 in addition to the VIS LED arrays 2, 3 radiating visible light. The NIR LED arrays 7, 8 illustrated in FIGS. 1a and 1b in each case likewise radiate light in a narrowly restricted spectral range.

The two NIR LED arrays 7, 8 are positioned at a right angle to the longitudinal direction L at a distance from each other which is greater than the diameter of the rotor blade 9 at the level of the NIR LED arrays 7, 8. One of the two NIR LED arrays 7 is arranged at the end of the roof of the machine housing 4 facing the rotor blade 9, and the other NIR LED array 8 is arranged at the end of the roof of the machine housing 4 facing away from the rotor blade 9.

Each of the NIR LED arrays 7, 8 is positioned in each case adjacent to one of the two conventional VIS LED arrays 2, 3. FIG. 1b shows the arrangement of the LED arrays/NIR LED arrays 2, 3, 7, 8 in the longitudinal direction L on the roof of the machine housing 4 of the wind energy plant WEA 1 in a side view. The NIR LED arrays 7, 8 are arranged as far apart from each other as possible in the longitudinal direction L of the machine housing 4 which corresponds to the longitudinal direction L of the drive shaft of the rotor, and are mounted at the end of the roof of the machine housing 4 facing the rotor blade. The NIR LED arrays 7, 8 are arranged further apart from each other at a right angle to the longitudinal direction L than the diameter of a rotor blade at the level of the NIR LED arrays 7, 8.

The NIR LED arrays 7, 8 and VIS LED arrays 2, 3 are arranged in each case at different levels above the roof of the machine housing 4 in order to be covered to the minimum degree.

The same applies to the arrangement—according to the invention—of the NIR LED arrays 7, 8. The NIR LED arrays 7, 8 used here radiate with the greatest intensity at a wavelength of $\lambda=850$ nm.

It is possible for example for the CEL-LI-IR850-230-F NIR LED of Contarnex Europe Limited to be used. It has a power of P=4 W and an operating alternating voltage of U=230 volts.

A surge protector is connected in each case in front of the NIR LED arrays 7, 8. The NIR LED arrays 7, 8 have in the horizontal direction a radiation pattern with essentially the same intensity along the 360° periphery. In the vertical radiation pattern the scattering angle amounts to approximately 15°. The NIR LED arrays 7, 8 require little maintenance and are also suitable for offshore use.

Figure 2:
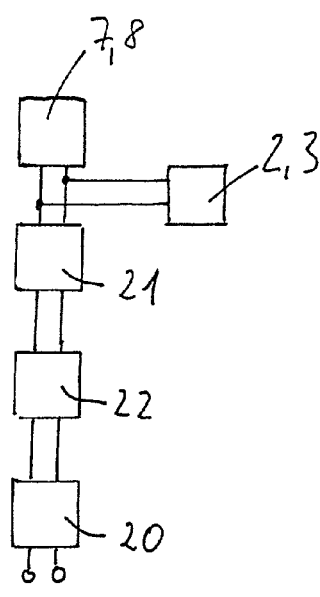
FIG. 2 is a block diagram of the infrared lamp according to the invention.

FIG. 2 shows the wiring—according to the invention—of the NIR LED arrays 7, 8 on the LED arrays 2, 3 conventionally used. The NIR LED arrays 7, 8 are connected parallel to the LED arrays 2, 3. The LED arrays 2, 3 and the NIR LED arrays 7, 8 are connected to a control voltage UR by way of a surge protector 20. The control voltage UR regulates a current supply unit 22 by means of a regulating circuit 21. The current supply unit 22 is designed in the form of an accumulator and is supplied with current by way of the wind energy plant 1 itself.

A detection device (not shown) delivers the regulating pulse for switching on the NIR LED arrays 7, 8. The detection device can be designed on the one hand in the form of a dimmer switch which when an exterior light intensity is not reached emits a regulating pulse and thus automatically switches on the LED arrays 2, 3 and the NIR LED arrays 7, 8 when a pre-set exterior light intensity is not reached.

The detection device can at the same time or instead be designed in the form of a detection device for a signature—emitted by an aircraft—of a transponder. When the signature is detected a regulating pulse is likewise sent which switches on the LED arrays 2, 3 and the NIR LED arrays 7, 8 and thus warns the approaching aircraft by switching on the flight navigation device in the visible and also in the NIR range.

Figure 3:
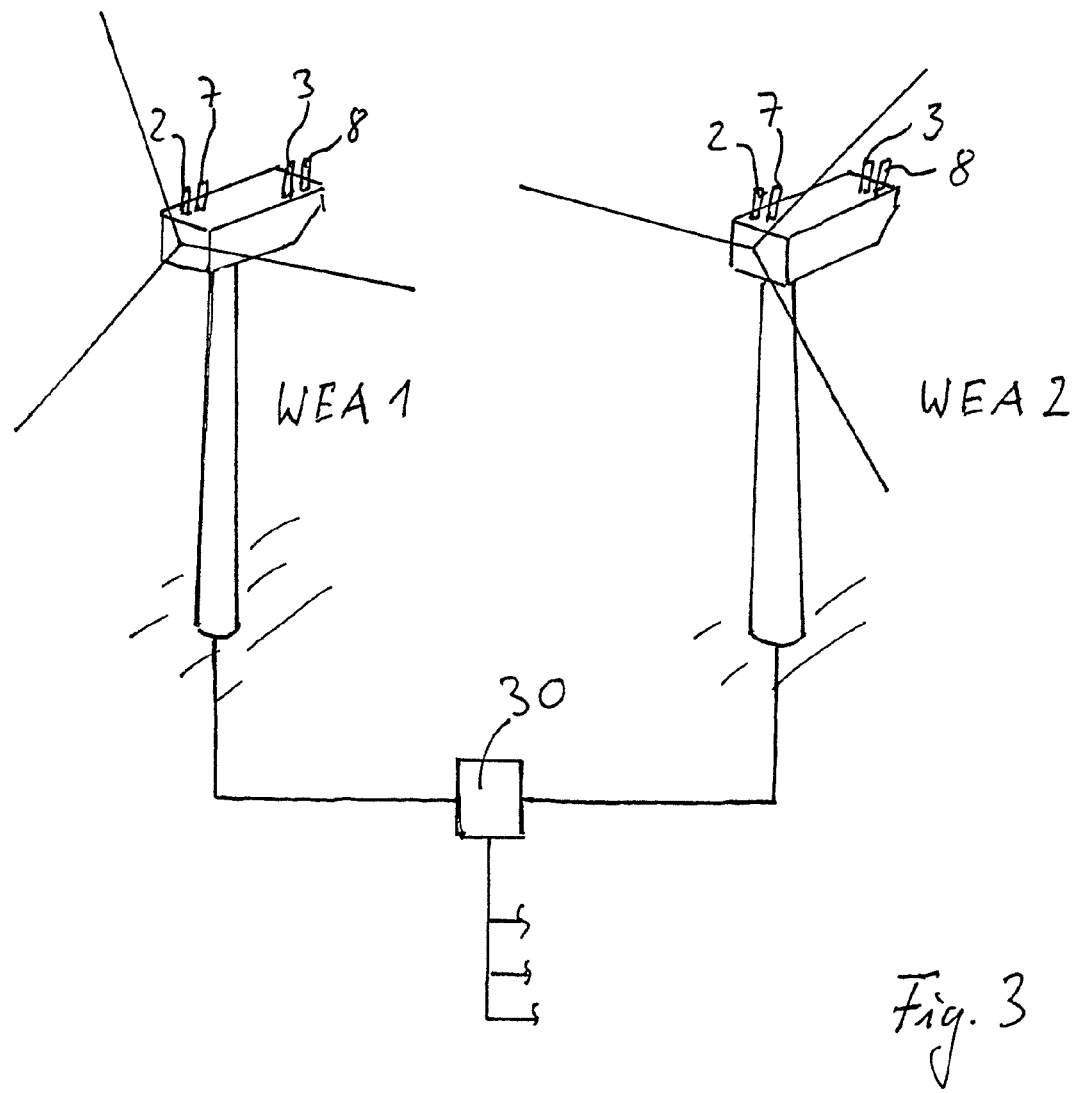
FIG. 3 shows a wind farm according to the invention.

FIG. 3 shows a wind farm with two wind energy plants WEA 1, WEA 2 which are coupled to each other by way of a synchronization unit 30. The synchronization unit 30 generates a synchronization signal which is supplied to each of the wind energy plants WEA1, WEA2 and which actuates and thus synchronizes the flight navigation devices. The synchronization unit 30 has additional connections for further wind energy plants of the wind farm.

Figure 4:
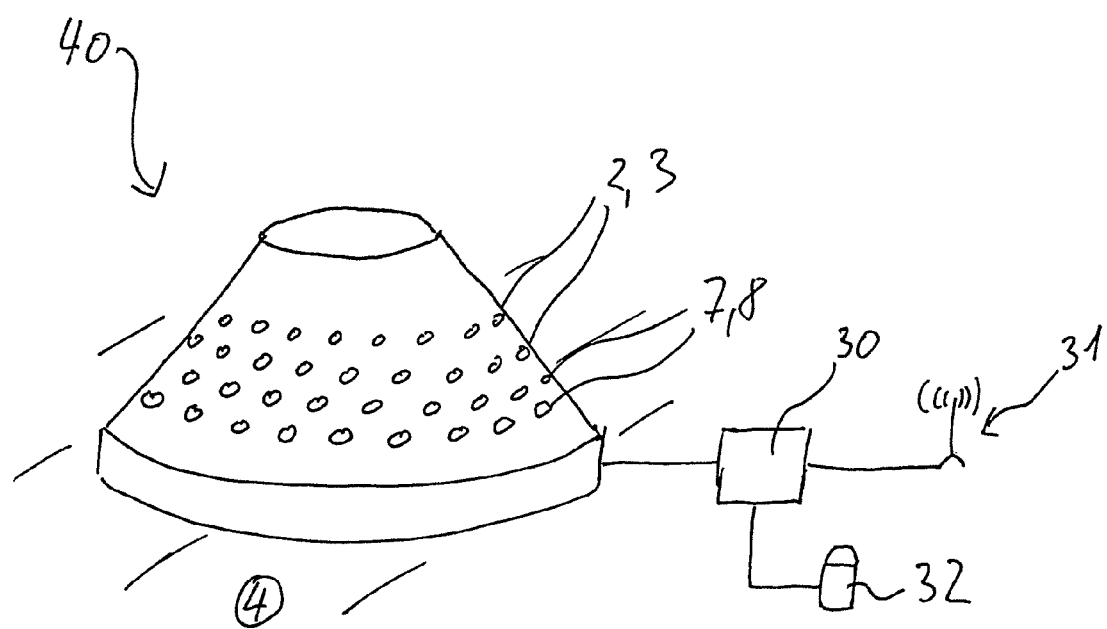
FIG. 4 shows a light source which has two VIS LED arrays and two NIR LED arrays.

FIG. 4 shows a light source 40 which has two VIS LED arrays and two NIR LED arrays. Each of the arrays 2, 3, 7, 8 has a row of individual LEDs extending around the light source 40 along a circular external periphery. The two NIR LED arrays 7, 8 adjacent to the roof of the machine housing 4 have exclusively NIR LEDs. The two LED rows arranged at a greater distance from the machine housing 4 are solely VIS LED rows 7, 8.

The light source 40 is an integrated component which is capable of being mounted on the roof of the machine housing 4. It is circular in a cross-section parallel to the roof of the machine housing 4 and frustoconical in a cross-section at a right angle thereto.

The flashing behaviour of the LED arrays 2, 3, 7, 8 is controlled by way of a synchronization unit 30. The synchronization unit 30 is switched on and off by a dimmer switch 32 when the brightness values of the environment of the light source 40 fall below or exceed pre-set brightness threshold values. The synchronization of a plurality of wind energy plants WEA 1, WEA 2 of a wind farm is carried out by means of a time signal capable of being detected by way of a receiving unit 31. This can be a GPS or even a DCF77 time signal which is received by all the light sources 40 of the wind farm by way of one respective receiving unit 32 assigned to them and which acts upon a synchronization unit 30 assigned to them in each case. In addition, the receiving unit 31 is designed for the reception of a transponder signal of an aircraft. In this case, when approaching the wind energy plant WEA1, WEA2, the aircraft emits a transponder signal with data on its position and signature, which is received by the receiving unit 31 and is recognized as an aircraft signature by the synchronization unit 30. The synchronization unit 30 determines the distance of the aircraft from the wind energy plant WEA1 and when a minimum permissible distance value is not reached it switches on the light source 40 of the flight navigation devices.

Alternatively, the synchronization unit 30 can be connected to a plurality of light sources 40. In this case the synchronization unit 30 can also be connected to light sources 40 of a plurality of or all the wind energy plants WEA 1, WEA 2 of the wind farm by way of cable or radio and can thus synchronize the individual light sources 40.

REFERENCES

WEA 1 wind energy plant
WEA 2 wind energy plant
2 LED array
3 LED array
4 machine housing
6 sea level or ground level
7 NIR LED array
8 NIR LED array
9 rotor blade
20 surge protector
21 control circuit
22 current supply unit
30 synchronization unit
31 receiver unit
32 dimmer switch
40 light source
L longitudinal direction
UR regulating voltage

What is claimed is:

1. A method of operating a flight navigation system in a wind energy plant, comprising: providing a flight navigation device, the lighting means of which have VIS-LEDs, being switched on and the VIS-LEDs radiating with a maximum intensity in the range of visible light, characterized in that at least one NIR-LED is switched on with the flight navigation device, and the at least one NIR-LED radiates with a maximum intensity in the NIR range and that the VIS-LEDs and NIR-LEDs are arranged in a plurality of annular rows arranged one above the other in the vertical direction, and that at least two rows have VIS-LEDs and at least two further rows have NIR-LEDs.

2. A method according to claim 1, characterized in that the at least one NIR-LED radiates with a maximum intensity in a range of from $\lambda=750$ to 950 nm.

3. A method according to claim 2, characterized in that the flight navigation device is switched into a night navigation mode in darkness and the night navigation mode is switched off in daylight, and the at least one NIR-LED is switched on and off with the night navigation mode.

4. A method according to claim 2, characterized in that the at least one NIR-LED is switched on by an external switch-on signal.

5. A method according to claim 1, characterized in that the at least one NIR-LED radiates with a maximum intensity at from $\lambda=800$ to 850 nm.

6. A method according to claim 5, characterized in that the flight navigation device is switched into a night navigation mode in darkness and the night navigation mode is switched off in daylight, and the at least one NIR-LED is switched on and off with the night navigation mode.

7. A method according to claim 5, characterized in that the at least one NIR-LED is switched on by an external switch-on signal.

8. A method according to claim 1, characterized in that the flight navigation device is switched into a night navigation mode in darkness and the night navigation mode is switched off in daylight, and the at least one NIR-LED is switched on and off with the night navigation mode.

9. A method according to claim 8, characterized in that the at least one NIR-LED is switched on by an external switch-on signal.

10. A method according to claim 1, characterized in that the at least one NIR-LED is switched on by an external switch-on signal.

11. A wind energy plant comprising: a flight navigation device, the lighting means of which have VIS-LEDs radiating with a maximum intensity in the range of visible light, characterized in that the flight navigation device has at least one NIR-LED radiating with a maximum intensity in the NIR range and the VIS-LEDs and NIR-LEDs are arranged in a plurality of annular rows arranged one above the other in the vertical direction, and that at least two rows have VIS-LEDs and at least two further rows have NIR-LEDs.

12. A wind energy plant according to claim 11, characterized in that the at least one NIR-LED radiates with a maximum intensity in the range of from $\lambda=650$ to 1000 nm.

13. A wind energy plant according to claim 12, characterized by a receiving unit for external switch-on signals and a synchronization unit which converts the external switch-on signal into an internal switch-on signal of the flight navigation device.

14. A wind energy plant according to claim 13, characterized by a dimmer switch which switches the synchronization unit.

15. A wind energy plant according to claim 14, characterized by at least one light source which has a plurality of VIS-LEDs which extend around the light source along an external horizontal periphery and which are arranged in such a way that in each horizontal direction at least one VIS-LED radiates with maximum intensity and at least one NIR-LED radiates.

16. A wind energy plant according to claim 11, characterized by a receiving unit for external switch-on signals and a synchronization unit which converts the external switch-on signal into an internal switch-on signal of the flight navigation device.

17. A wind energy plant according to claim 11, characterized in that the VIS-LEDs and NIR-LEDs are arranged in a plurality of annular rows arranged one above the other in the vertical direction, and at least two rows have VIS-LEDs and one row has NIR-LEDs.

18. A wind energy plant according to claim 11, wherein the wind energy plant is a wind farm with at least two wind energy plants, which have in each case at least one NIR-LED, the NIR-LEDs emitting NIR flashing pulses and the NIR-LEDs of different wind energy plants being synchronized.

19. A wind energy plant according to claim 18, characterized in that the NIR-LEDs of different wind energy plants are synchronized by means of an external time signal.

20. A wind farm according to claim 19, characterized by at least one receiving unit for an external time signal for reach of the wind energy plants, which acts upon one synchronization unit in each case with a synchronization pulse.

21. A wind energy plant according to claim 18, characterized by a synchronization unit of the flight navigation device of the at least two wind energy plants, by which both the flashing pulses of the NIR-LED and the flashing pulses of the VIS-LEDs of different wind energy plants are capable of being synchronized contemporaneously.

22. A method of operating a flight navigation system in a wind farm characterized by at least two wind energy plants, comprising: providing a flight navigation device and at least one NIR-LED for each wind energy plant in the at least two wind energy plants, the NIR-LED emitting NIR flashing pulses and the NIR-LED of different wind energy plants in the at least two wind energy plants being synchronized.

23. The method according to claim 22, characterized in that the NIR-LEDs of different wind energy plants are synchronized by means of an external time signal.

24. The method according to claim 23, characterized by at least one receiving unit for an external time signal for each of the wind energy plants, which acts upon one synchronization unit in each case with a synchronization pulse.

25. The method according to claim 22, characterized by a synchronization unit of the flight navigation device of the at least two wind energy plants, by which both the flashing pulses of the NIR-LED and the flashing pulses of the VIS-LED of different wind energy plants are capable of being synchronized contemporaneously.

* * * * *